(12) United States Patent
Nagamori et al.

(10) Patent No.: US 8,133,948 B2
(45) Date of Patent: Mar. 13, 2012

(54) NITRILE RUBBER COMPOSITION, CROSS-LINKABLE NITRILE RUBBER COMPOSITION AND CROSS-LINKED RUBBER

(75) Inventors: Hiroyasu Nagamori, Kawagoe (JP); Kiyonori Umetsu, Tokyo (JP)

(73) Assignee: Zeon Corporation, Tokyo (JP)

( * ) Notice: Subject to any disclaimer, the term of this patent is extended or adjusted under 35 U.S.C. 154(b) by 436 days.

(21) Appl. No.: 12/306,600

(22) PCT Filed: Jun. 22, 2007

(86) PCT No.: PCT/JP2007/062604
§ 371 (c)(1), (2), (4) Date: Dec. 24, 2008

(87) PCT Pub. No.: WO2008/001692
PCT Pub. Date: Jan. 3, 2008

(65) Prior Publication Data
US 2009/0234054 A1    Sep. 17, 2009

(30) Foreign Application Priority Data

Jun. 27, 2006 (JP) ................. 2006-176134

(51) Int. Cl.
*C08K 3/36* (2006.01)

(52) U.S. Cl. ........ 524/492; 524/533; 524/535; 524/565; 524/566

(58) Field of Classification Search .......... 524/492, 524/533, 535, 565, 566
See application file for complete search history.

(56) References Cited

U.S. PATENT DOCUMENTS

| | | | |
|---|---|---|---|
| 5,208,294 A * | 5/1993 | Brown | 525/263 |
| 2006/0063627 A1 | 3/2006 | Tomobuchi | |

FOREIGN PATENT DOCUMENTS

| | | |
|---|---|---|
| EP | 1 550 694 A1 | 7/2005 |
| EP | 1 637 767 A2 | 3/2006 |
| JP | 2002-53705 A | 2/2002 |
| JP | 2004-250645 A | 9/2004 |
| JP | 2005-36874 A | 2/2005 |
| JP | 2005-281387 A | 10/2005 |
| JP | 2005-281505 A | 10/2005 |
| JP | 2006-84010 A | 3/2006 |

OTHER PUBLICATIONS

Extended European Search Report dated May 26, 2010.

* cited by examiner

*Primary Examiner* — Margaret Moore
(74) *Attorney, Agent, or Firm* — Birch, Stewart, Kolasch & Birch, LLP

(57) ABSTRACT

Disclosed herein are a nitrile rubber composition comprising a nitrile rubber (a) including an $\alpha,\beta$-ethylenically unsaturated nitrile monomer unit and having iodine value of 100 or less, an $\alpha,\beta$-ethylenically unsaturated carboxylic acid metallic salt (b), and silane-treated fumed silica and/or calcinated wet silica (c); a cross-linkable nitrile rubber composition comprising the above nitrile rubber composition and a crosslinking agent (d); and a cross-linked rubber obtained by crosslinking the cross-linkable nitrile rubber composition. The present invention can provide a nitrile rubber composition and a cross-linkable nitrile rubber composition, capable of giving a highly-saturated cross-linked nitrile rubber having high tensile stress and excellent heat resistance, and a cross-linked rubber thereof.

11 Claims, No Drawings

NITRILE RUBBER COMPOSITION, CROSS-LINKABLE NITRILE RUBBER COMPOSITION AND CROSS-LINKED RUBBER

FIELD OF THE INVENTION

The present invention relates to a nitrite rubber composition and a cross-linkable nitrite rubber composition capable of giving a highly-saturated cross-linked nitrile rubber having high tensile stress and excellent heat resistance, and a cross-linked rubber thereof.

DESCRIPTION OF THE RELATED ART

As a rubber having excellent oil resistance, heat resistance and ozone resistance, nitrite group containing highly-saturated copolymer rubber (i.e. "highly-saturated nitrite rubber" including hydrogenated nitrile rubber) has been known, and the cross-linked rubber thereof has been used as a material for various automotive rubber products such as a belt, hose, gasket, packing and oil-seal. Recently, required qualities of the material rubbers used for automotive rubber products have become further severe, and particularly in a bulk rubber product other than a fiber impregnated body or metal composite body, further excellent heat resistance has been demanded since temperature in an engine room is easier to increase due to downsized and souped-up automobile engine.

In response to this, Patent Article 1 proposes a cross-linked rubber obtained by blending silica and zinc methacrylate with a highly-saturated nitrite rubber, and crosslinking it by a crosslinking agent. However, the cross-linked rubber has defects such as insufficient improvement in heat resistance and reduction in tensile stress.

Patent Article 1: The Japanese Unexamined Patent Publication 2006-84010.

DISCLOSURE OF INVENTION

Problem to be Solved by the Invention

A purpose of the present invention is to provide a nitrile rubber composition and a cross-linkable nitrile rubber composition capable of giving a highly-saturated cross-linked nitrile rubber having high tensile stress and excellent heat resistance, and a cross-linked rubber thereof.

Means for Solving the Problem

The present inventors found the following, as a result of keen examinations, and came to complete the present invention based on the findings:

(i) insufficient improvement in heat resistance and reduction in tensile stress shown in the cross-linked rubber of the above Patent Article 1 (Japanese Unexamined Patent Publication 2006-84010) are caused by using intact wet silica without any particular treatment (specifically, in Patent Article 1, "Nipsil VN-3 manufactured by Nippon Silica Industrial Co Ltd." is used.), or using hydrophobized silica obtained by treating wet silica with organic silane (specifically, in Patent Article 1, "Nipsil SS-10 manufactured by Nippon Silica Industrial Co Ltd." is used.); and (ii) in contrast, by using specifically-treated silica in combination with a highly-saturated nitrile rubber and α,β-ethylenically unsaturated carboxylic acid metallic salt, the above purpose can be attained.

Namely, according to the present invention, there is provided a nitrile rubber composition comprising a nitrile rubber (a) including an α,β-ethylenically unsaturated nitrile monomer unit and having iodine value of 100 or less, an α,β-ethylenically unsaturated carboxylic acid metallic salt (b), and silane-treated fumed silica and/or calcinated wet silica (c).

Preferably, a content of said α,β-ethylenically unsaturated carboxylic acid metallic salt (b) is 3 to 120 parts by weight per 100 parts by weight of said nitrile rubber (a). Preferably, a content of said silane-treated fumed silica and/or calcinated wet silica (c) is 5 to 300 parts by weight per 100 parts by weight of said nitrile rubber (a).

Preferably, said α,β-ethylenically unsaturated carboxylic acid metallic salt (b) is a zinc salt and/or magnesium salt of unsaturated monocarboxylic acid, more preferably zinc dimethacrylate. Preferably, said silane-treated fumed silica is obtained by surface treatment of fumed silica with (meth) acryloxy group containing silane and/or alkyl group containing halogenated silane. Preferably, said calcinated wet silica is adjusted to have a concentration of surface silanol groups of 3 groups/nm$^2$ or less by calcinating wet silica.

Also, according to the present invention, there is provided a cross-linkable nitrite rubber composition comprising any one of the above nitrile rubber compositions and a crosslinking agent (d).

In the cross-linkable nitrite rubber composition of the present invention, preferably, a content of said crosslinking agent (d) is 0.2 to 20 parts by weight per 100 parts by weight of the nitrile rubber (a). Also, said crosslinking agent (d) is preferably an organic peroxide.

Further, according to the present invention, there is provided a cross-linked rubber obtained by crosslinking any one of the above cross-linkable nitrite rubber compositions. The cross-linked rubber of the present invention is preferably a belt or seal material.

Effects of the Invention

According to the present invention, there are provided a nitrile rubber composition and a cross-linkable nitrite rubber composition capable of giving a highly-saturated cross-linked nitrile rubber having high tensile stress and excellent heat resistance, and a cross-linked rubber thereof.

BEST MODE FOR WORKING THE INVENTION

A nitrile rubber composition of the present invention comprises a nitrile rubber (a) including an α,β-ethylenically unsaturated nitrile monomer unit and having iodine value of 100 or less, an α,β-ethylenically unsaturated carboxylic acid metallic salt (b), and silane-treated fumed silica and/or calcinated wet silica (c).

Also, a cross-linkable nitrile rubber composition of the present invention comprises the above nitrile rubber composition and a crosslinking agent (d).

Note that a rubber including an α,β-ethylenically unsaturated nitrile monomer unit may be referred to as "nitrile rubber" as described above.

Nitrile Rubber Composition

Nitrile Rubber (a)

The nitrile rubber (a) used in the present invention includes an α,β-ethylenically unsaturated nitrile monomer unit and has iodine value of 100 or less. A monomer forming the α,β-ethylenically unsaturated nitrile monomer unit of the nitrile rubber (a) may be any α,β-ethylenically unsaturated compound having a nitrile group without limitation, and there may be mentioned acrylonitrile; α-halogenoacrylonitrile such as α-chloroacrylonitrile and α-bromoacrylonitrile; α-alkylacrylonitrile such as methacrylonitrile; etc. Among these, acrylonitrile and methacrylonitrile are preferable. As the α,β-ethylenically unsaturated nitrile monomer, a plurality of these may be used in combination.

A content of the α,β-ethylenically unsaturated nitrile monomer units in the nitrile rubber (a) is preferably 10 to 60 wt %, more preferably 15 to 55 wt % and particularly preferably 20 to 50 wt % per 100 wt % of all monomer units. When the content of the α,β-ethylenically unsaturated nitrile monomer units is too small, oil resistance of the obtained cross-linked rubber may be reduced, and in contrast, too large content may cause to reduce cold resistance.

The nitrile rubber (a) normally includes, a diene monomer unit and/or α-olefin monomer unit as well as the α,β-ethylenically unsaturated nitrile monomer unit to provide rubber elasticity of the obtained cross-linked rubber.

As a diene monomer forming the diene monomer unit, there may be mentioned a conjugated diene with carbon number of 4 or more such as 1,3-butadiene, isoprene, 2,3-dimethyl-1,3-butadiene, and 1,3-pentadiene; a nonconjugated diene with carbon number of preferably 5 to 12 such as 1,4-pentadiene, 1,4-hexadiene, vinyl norbornene and dicyclopentadiene; etc. Among these, conjugated diene is preferable, and 1,3-butadiene is more preferable.

An α-olefin monomer forming the α-olefin monomer unit preferably has carbon number of 2 to 12, and there may be mentioned, for example, ethylene, propylene, 1-butene, 4-methyl-1-pentene, 1-hexene, 1-octene, etc.

A content of the diene monomer unit and/or α-olefin monomer unit in the nitrile rubber (a) is preferably 20 to 90 wt %, more preferably 30 to 85 wt %, further preferably 40 to 80 wt % and particularly preferably 50 to 80 wt % per 100 wt % of all monomer units. When the content of these monomer units are too small, elasticity of the obtained cross-linked rubber may be decreased; and too large content may cause to deteriorate heat resistance and chemical stability.

The nitrite rubber (a) may also includes other monomer unit copolymerizable to the α,β-ethylenically unsaturated nitrile monomer, and diene monomer and/or α-olefin monomer. As a monomer forming other monomer unit, there may be mentioned an aromatic vinyl monomer, a fluorine containing vinyl monomer, α,β-ethylenically unsaturated monocarboxylic acid and ester thereof, an α,β-ethylenically unsaturated polyvalent carboxylic acid, an α,β-ethylenically unsaturated polyvalent carboxylic acid monoester and polyvalent ester, an α,β-ethylenically unsaturated polyvalent carboxylic acid anhydride, a cross-linkable monomer, copolymerizable anti-aging agent, etc.

As the aromatic vinyl monomer, styrene, α-methylstyrene, vinylpyridine, etc., may be mentioned.

As the fluorine containing vinyl monomer, fluoroethylvinyl ether, fluoropropylvinyl ether, o-trifluoromethylstyrene, vinyl pentafluorobenzoate, difluoroethylene, tetrafluoroethylene, etc., may be mentioned.

As the α,β-ethylenically unsaturated monocarboxylic acid, for example, acrylic acid, methacrylic acid, crotonic acid, cinnamic acid, etc., may be mentioned.

As the α,β-ethylenically unsaturated monocarboxylic acid ester, for example, ethyl (meth)acrylate (indicating ethyl acrylate or ethyl methacrylate; the same goes for the following compounds such as butyl (meth)acrylate), butyl (meth)acrylate, 2-ethylhexyl (meth)acrylate, etc.

As the α,β-ethylenically unsaturated polyvalent carboxylic acid, for example, maleic acid, fumaric acid, itaconic acid, etc., may be mentioned.

As the α,β-ethylenically unsaturated polyvalent carboxylic acid monoester, for example, monomethyl maleate, monoethylmaleate, monobutylmaleate, monocyclopentylmaleate, monoethyl itaconate, monomethylcyclopentyl itaconate, etc. may be mentioned.

As the α,β-ethylenically unsaturated polyvalent carboxylic acid polyvalent ester, for example, dimethyl maleate, di-n-butyl fumarate, dimethyl itaconate, di-2-ethylhexyl itaconate, etc., may be mentioned.

As the α,β-ethylenically unsaturated polyvalent carboxylic anhydride, for example, maleic anhydride, itaconic anhydride, etc., may be mentioned.

As the cross-linkable monomer, there may be mentioned a polyfunctional ethylenically unsaturated monomer including a divinyl compound such as divinylbenzene; di(meth)acrylates such as diethylene glycol di(meth)acrylate and ethylene glycol di(meth)acrylate; tri(meth)acrylates such as trimethylolpropane tri(meth)acrylate; etc., and a self-cross-linkable monomer such as N-methylol (meth)acrylamide and N,N'-dimethylol (meth)acrylamide.

As the copolymerizable anti-aging agent, there may be exemplified N-(4-anilinophenyl)acrylamide, N-(4-anilinophenyl)methacrylamide, N-(4-anilinophenyl)cinnamamide, N-(4-anilinophenyl)crotonamide, N-phenyl-4-(3-vinylbenzyloxy)aniline, N-phenyl-4-(4-vinylbenzyloxy) aniline, etc.

These other copolymerizable monomers may be used in combination. A content of these other monomer units of the nitrile rubber (a) is preferably 60 wt % or less, more preferably 50 wt % or less and particularly preferably 10 wt % or less per 100 wt % of all monomer units.

The nitrile rubber (a) used in the present invention has the iodine value of 100 or less, preferably 80 or less, more preferably 60 or less and particularly preferably 30 or less. When the iodine value of the nitrile rubber (a) is too high, ozone resistance of the obtained cross-linked rubber may be reduced.

Also, Mooney viscosity [$ML_{1+4}$ (100° C.)] of the nitrile rubber (a) used in the present invention is preferably 15 to 200, more preferably 30 to 150 and particularly preferably 45 to 120. When the Mooney viscosity of the nitrile rubber (a) is too low, mechanical properties of the obtained cross-linked rubber may be reduced. In contrast, too high Mooney viscosity may cause to reduce workability of the nitrile rubber composition.

A production method of the nitrile rubber (a) used in the present invention is not particularly limited. In general, a method to copolymerize the α,β-ethylenically unsaturated nitrite monomer, diene monomer and/or α-olefin monomer, and optionally-added other copolymerizable monomer thereto is convenient and preferable. As a polymerization method, any one of known polymerization method, such as emulsion polymerization method, suspension polymerization method, bulk polymerization method and solution polymerization method, can be used, and emulsion polymerization method is preferable because it is easy to control the polymerization.

Also, when iodine value of the copolymer obtained by copolymerization is higher than the above range, the copolymer may be hydrogenated (hydrogenation reaction). A hydrogenation method is not particularly limited and any known method may be applicable.

α,β-Ethylenically Unsaturated Carboxylic Acid Metallic Salt (b)

The α,β-ethylenically unsaturated carboxylic acid metallic salt (b) used in the present invention is a salt of α,β-ethylenically unsaturated carboxylic acid and metal.

As an α,β-ethylenically unsaturated carboxylic acid forming the α,β-ethylenically unsaturated carboxylic acid metallic salt (b), those having at least univalent carboxyl group (i.e. those having at least one "—COOH group" which forms no ester bond and the like) for generating a metallic salt may be mentioned. Specific examples may include unsaturated monocarboxylic acid, unsaturated dicarboxylic acid, unsaturated dicarboxylic acid monoester, etc.

As the unsaturated monocarboxylic acid, acrylic acid, methacrylic acid, etc., may be mentioned. As the unsaturated dicarboxylic acid, maleic acid, fumaric acid, itaconic acid, etc, may be mentioned. As the unsaturated dicarboxylic acid monoester, monomethyl maleate, monoethyl maleate, monomethyl itaconate, monoethyl itaconate, etc., may be mentioned. Among these ethylenically unsaturated carboxylic acids, ethylenically unsaturated carboxylic acids having no ester group are preferable, unsaturated monocarboxylic acids are more preferable, and methacrylic acid is particularly preferable.

As a metal forming the α,β-ethylenically unsaturated carboxylic acid metallic salt, any of those formable of a salt with the above α,β-ethylenically unsaturated carboxylic acid can be used without limitation, and various metals can be used. Among these, zinc, magnesium, calcium, barium, titanium, chromium, iron, cobalt, nickel, aluminum, tin and lead are preferable, zinc, magnesium, calcium and aluminum are more preferable, and zinc and magnesium are particularly preferable.

The α,β-ethylenically unsaturated carboxylic acid metallic salt (b) can be obtained by reacting the α,β-ethylenically unsaturated carboxylic acid with said metallic compound to form a salt. As the metallic compound used in this reaction, an oxide, hydroxide or carbonate may be mentioned.

An amount of the metal, used for forming the above salt, is preferably 0.2 to 3 moles, more preferably 0.3 to 2.5 moles and particularly preferably 0.4 to 2 moles with respect to 1 mole of carboxyl group in the α,β-ethylenically unsaturated carboxylic acid. When the amount of the α,β-ethylenically unsaturated carboxylic acid is too large (metal amount is too small), an odor of the residual monomers in the nitrile rubber composition may be strong. On the other hand, when the α,β-ethylenically unsaturated carboxylic acid is too small in amount (metal amount is too large), strength of the obtained cross-linked rubber may be reduced.

The α,β-ethylenically unsaturated carboxylic acid metallic salt (b) may be blended to the rubber in the form of a preliminarily-formed metallic salt when preparing the nitrile rubber composition by kneading together with other components constituting the nitrile rubber composition such as the nitrile rubber (a). Alternatively, the metallic salt may be formed without preliminary reaction prior to the kneading process by blending said α,β-ethylenically unsaturated carboxylic acid and said metallic compound when kneading with other components constituting the nitrile rubber composition, and reacting them in the kneading process.

A content of the α,β-ethylenically unsaturated carboxylic acid metallic salt (b) in the nitrile rubber composition of the present invention is not particularly limited, but is preferably 3 to 120 parts by weight, more preferably 5 to 100 parts by weight and particularly preferably 10 to 60 parts by weight per 100 parts by weight of the nitrile rubber (a). When the content of the component (b) in the nitrile rubber composition of the present invention is too small, the obtained cross-linked rubber may be inferior in strength properties; and in contrast, too large content may cause to reduce elongation.

Silane-Treated Fumed Silica and/or Calcinated Wet Silica (c)

The nitrile rubber composition of the present invention includes silane-treated fumed silica and/or calcinated wet silica (c) in addition to the above component (a) and component (b). Namely, the nitrile rubber composition of the present invention includes, as the component (c), any one or both of silane-treated fumed silica and calcinated wet silica. In the nitrite rubber composition of the present invention, it is necessary to add silane-treated fumed silica and/or calcinated wet silica (c) preliminarily prepared in the respective forms when forming the composition.

For example, in the process of preparing the nitrile rubber composition of the present invention, if mixing silane coupling agent and fumed silica, i.e. materials for making silane-treated fumed silica, into the nitrile rubber (a) together with other components constituting the nitrile rubber composition, the obtained cross-linked rubber may be insufficient in improvement effect of heat resistance.

The silane-treated fumed silica is obtained by forming a dry silica (fumed silica) by a method to hydrolyze silicon tetrachloride at high-temperature in oxyhydrogen flame (high-temperature flame generated by belching hydrogen and oxygen simultaneously by using blowpipe, and igniting), and treating the surface thereof with a predetermined silane compound. Note that BET specific surface area of the fumed silica is preferably 10 to 500 $m^2/g$, more preferably 30 to 300 $m^2/g$ and particularly preferably 50 to 200 $m^2/g$. By using the fumed silica having BET specific surface area within the range, improvement effects of tensile stress and heat resistance in the obtained cross-linked rubber may be further significant.

The silane-treated fumed silica is obtained by surface treatment of fumed silica with a silane compound, and the surface treatment with the silane compound allows to hydrophobize a hydrophilic silanol group in the surface of the fumed silica and to improve affinity between the fumed silica and the nitrile rubber (a). A type of the silane compound used in the surface treatment is not particularly limited, but (meth)acryloxy group containing silane and alkyl group containing halogenated silane are preferable.

As the (meth)acryloxy group containing silane, acryloxysilane, diacryloxysilane, methacryloxysilane, dimethacryloxysilane, etc., may be mentioned. As the alkyl group containing halogenated silane, methyl trichlorosilane, dimethyl dichlorosilane, trimethyl chlorosilane, ethyl trichlorosilane, diethyl dichlorosilane, triethyl chlorosilane, etc., may be mentioned. Among these, methacryloxysilane and dimethyl dichlorosilane are preferable.

The calcinated wet silica is prepared by firing wet silica. As the wet silica used for the calcinated wet silica, the one synthesized by neutralization of sodium silicate and mineral acid (normally sulfuric acid), etc., may be mentioned. For example, any silica can be used, either obtained by a precipitation method to perform neutralization in an alkaline side, or obtained by a gel method to perform neutralization in an acid side.

As for firing conditions of the wet silica to obtain the calcinated wet silica, the wet silica are preferably heated at 500 to 1,000° C. for 30 to 120 minutes, more preferably at 600 to 950° C. for 30 to 90 minutes and particularly preferably at 700 to 900° C. for 30 to 60 minutes. When heating temperature is too low or heating time is too short, the obtained calcinated wet silica may cause insufficient improvement effects of heat resistance and tensile stress of the obtained cross-linked rubber. When heating temperature is too high or heating time is too long, the silica may be sintered to coarsen.

Loss on heat of the calcinated wet silica is preferably 2 wt % or less. When loss on heat is too large, compression set of the obtained cross-linked rubber may be increased, or heat resistance may be reduced.

The calcinated wet silica has surface silanol group concentration of preferably 3 groups/nm$^2$ or less, more preferably 2.5 groups/nm$^2$ or less. When the surface silanol group concentration is too large, tensile stress and heat resistance of the obtained cross-linked rubber are liable to be reduced. Since the calcination of wet silica reduces surface silanol group concentration, it results in improving affinity to the nitrile rubber (a). Note that the surface silanol group concentration can be obtained by drying silica, followed by immersing in deuterated water, and determining free-proton amount in deuterated water by NMR.

BET specific surface area of the calcinated wet silica is preferably 10 to 500 m$^2$/g, more preferably 30 to 300 m$^2$/g and particularly preferably 50 to 200 m$^2$/g. When BET specific surface area of the calcinated wet silica is too large, viscosity of the cross-linkable nitrile rubber composition is liable to increase to cause reduction in moldability. When BET specific surface area is too small, the obtained cross-linked rubber may be reduced in tensile stress and heat resistance.

pH of the calcinated wet silica is preferably 3.5 to 8. When pH is too low, crosslinking rate may be reduced and crosslink density of the obtained cross-linked rubber may be insufficient, resulting in large compression set or reduced heat resistance. In contrast, too high pH may cause scorch at molding process.

A content of the silane-treated fumed silica and/or calcinated wet silica (c) in the nitrile rubber composition of the present invention is preferably 5 to 300 parts by weight, more preferably 10 to 200 parts by weight and particularly preferably 20 to 100 parts by weight per 100 parts by weight of the nitrile rubber (a). When the content of the component (c) in the nitrile rubber composition is too small, the obtained cross-linked rubber is liable to have insufficient improvement effects of tensile stress and heat resistance, and large compression set. In contrast, too large content of the component (c) in the nitrile rubber composition may cause to reduce workability of the nitrile rubber composition.

Note that weight ratio of the α,β-ethylenically unsaturated carboxylic acid metallic salt (b) and silica (c) in the nitrile rubber composition of the present invention is, in terms of a value of (b)/(c), preferably 1/100 to 200/100, more preferably 10/100 to 100/100.

Optional Components

The nitrile rubber composition of the present invention may include, if needed, other components in addition to the above component (a), component (b) and component (c). As such other components, although not particularly limited, for example, polyether and organic metallic salt having a fluoro group and/or sulfonyl group, etc., may be mentioned. Particularly, by using these polyether and organic metallic salt having a fluoro group and/or sulfonyl group in combination, the obtained cross-linked rubber may be improved in antistatic characteristic.

As the polyether usable in the present invention, any polymer having plurality of ether bonds in the main chain can be used without particular limitation, and a preferred example thereof is a (co)polymer containing monomer unit(s) of the ethylene oxide and/or propylene oxide in a total amount of preferably 10 mol % or more, more preferably 40 mol % or more, further preferably 60 mol % or more and particularly preferably 80 mol % or more. When the total amount of the monomer unit(s) of the ethylene oxide and/or propylene oxide is too small, antistatic effect of the obtained cross-linked rubber is liable to be reduced.

Note that when including the polyether, it is preferable to use those having both ethylene oxide monomer unit and propylene oxide monomer unit, to thereby further improve the effect attained by addition thereof.

The polyether containing an ethylene oxide monomer unit has an effect to stabilize a metallic ion because of coordination of an ionized metal in the ethylene oxide monomer unit. Then, the resultant segmental movement of the ethylene oxide monomer unit has such function to transport the ion. However, too many ethylene oxide monomer units may result in crystallization to cause to inhibit segmental movement of the molecular chain. Therefore, by using the polyether further containing propylene oxide monomer units as well, the above crystallization can be prevented, and antistatic effect can be improved.

Also, if the polyether contains a carbon-carbon unsaturated bond, it can be cross-linked with the nitrile rubber (a), resulting in toughening the obtained cross-linked rubber, which is preferable. To obtain the polyether containing a carbon-carbon unsaturated bond, it is preferable to copolymerize monomers containing a carbon-carbon unsaturated bond (which is hereinafter referred to as "unsaturated bond containing monomer"), and it is particularly preferable to copolymerize allyl glycidyl ethers because of its high copolymerizability.

As the polyether, because of further significant antistatic effect, a ratio of the ethylene oxide monomer unit, propylene oxide monomer unit and unsaturated bond containing monomer unit "ethylene oxide monomer unit/propylene oxide monomer unit/unsaturated bond containing monomer unit" is preferably 50 to 99 mol %/0.5 to 49.5 mol %/0.5 to 20 mol %, more preferably 60 to 96 mol %/2 to 38 mol %/2 to 10 mol %. Note that the polyether can be obtained, for example, by a conventionally-known polymerization method such as solution polymerization by using a conventionally-known polymerization catalyst as a ring-opening polymerization catalyst for an oxirane compound.

A weight-average molecular weight of the polyether is preferably 10,000 or more, more preferably 10,000 to 1,000, 000 and particularly preferably 50,000 to 800,000. When the weight-average molecular weight is too small, bleeding may occur in the obtained cross-linked rubber, and when the weight-average molecular weight is too large, workability of the nitrile rubber composition may be reduced.

A content of the polyether in the nitrite rubber composition of the present invention is preferably 0.1 to 20 parts by weight, more preferably 0.5 to 10 parts by weight and particularly preferably 1 to 10 parts by weight per 100 parts by weight of the nitrile rubber (a). When the content of the polyether is too small, antistatic effect of the obtained cross-linked rubber is liable to be decreased. In contrast, too large content may cause bleeding.

As the organic metallic salt having a fluoro group and/or sulfonyl group, an organic alkali metallic salt and organic alkaline-earth metallic salt having a fluoro group and/or sulfonyl group are preferable, the organic alkali metallic salt is more preferable, and an organic lithium salt is particularly preferable.

As an example of the above organic lithium salt, $LiCF_3SO_3$, $LiN(SO_2CF_3)_2$ [compound name: lithium-bis(trifluoromethanesulfonyl)imide], $LiC(SO_2CF_3)_2$, $LiCH(SO_2CF_3)_2$, $LiSF_5CF_2SO_3$, $Li[\{OCH(CF_3)_2\}Nb]$, etc., may be mentioned.

As mentioned above, when the polyether contains an ethylene oxide monomer unit, the ethylene oxide monomer unit stabilizes a metallic ion and also causes segmental movement to have function to transport the ion. Therefore, when using the polyether and the organic metallic salt having a fluoro group and/or sulfonyl group, it is preferable to apply procedure including preliminarily mixing these sufficiently and then mixing the other components constituting the nitrile rubber composition. Note that a product "Sankonol TBX-8310" manufactured by Sanko Chemical Ind. Co., Ltd. is commercially available as a mixture of ethylene oxide-propylene oxide-allyl glycidyl ether copolymer and an organic lithium salt having a fluoro group and/or sulfonyl group, so that it is suitable to use in the above procedure.

A content of the organic metallic salt having a fluoro group and/or sulfonyl group in the nitrile rubber composition of the present invention is preferably 0.01 to 10 parts by weight, more preferably 0.2 to 8 parts by weight and particularly preferably 0.5 to 6 parts by weight per 100 parts by weight of the nitrile rubber (a). When the content of the organic metallic salt having a fluoro group and/or sulfonyl group in the nitrile rubber composition of the present invention is too small, antistatic effect of the obtained cross-linked rubber is liable to be reduced. In contrast, too large content may cause to reduce workability of the nitrile rubber composition.

Cross-Linkable Nitrile Rubber Composition

The cross-linkable nitrile rubber composition of the present invention comprises the above nitrile rubber composition and a crosslinking agent (d).

As the crosslinking agent (d), there may be used any conventionally-known crosslinking agent, normally used for crosslinking in a rubber, such as organic peroxide, polyamine compound, polyvalent epoxy compound, polyvalent isocyanate compound, aziridine compound, sulfur compound, basic metallic oxide and organometallic halide. Among these, organic peroxide and polyamine compound are preferable, and organic peroxide is more preferable since it can easily give a cross-linked rubber with large elongation.

As the organic peroxide, normally, any of those used as a vulcanizing agent in rubber processing can be used without limitation. As an example of the organic peroxide, dialkyl peroxides, diacyl peroxides, peroxyesters, etc., may be mentioned.

As the dialkyl peroxides, dicumyl peroxide, di-t-butyl peroxide, 1,3-bis(t-butylperoxyisopropyl)benzene, etc., may be mentioned.

As the diacyl peroxides, dibenzoyl peroxide, diisobutyryl peroxide, etc., may be mentioned.

As the peroxyesters, t-butyl peroxypivalate, t-butyl peroxyisopropyl percarbonate, etc., may be mentioned.

A content of the crosslinking agent (d) in the cross-linkable nitrile rubber composition of the present invention is preferably 0.2 to 20 parts by weight, more preferably 1 to 15 parts by weight and particularly preferably 1.5 to 10 parts by weight per 100 parts by weight of the nitrile rubber (a). When the content of the crosslinking agent (d) is too small, it may be impossible to obtain a cross-linked rubber with excellent mechanical properties and small compression set. In contrast, too large content may cause to reduce resistance to fatigue of the cross-linked rubber.

The cross-linkable nitrile rubber composition of the present invention can include a compounding agent normally used in the rubber processing field in addition to the above nitrile rubber (a), α,β-ethylenically unsaturated carboxylic acid metallic salt (b), silane-treated fumed silica and/or calcinated wet silica (c), crosslinking agent (d), and the optionally-added polyether and organic metallic salt having a fluoro group and/or sulfonyl group. As the compounding agent, for example, there may be mentioned a reinforcement filler such as carbon black, anon-reinforcement filler such as calcium carbonate and clay, a silane coupling agent, an anti-aging agent, a light stabilizer, an antiscorching agent such as a primary amine, a plasticizer, a processing aid, a lubricant, an adhesive, a lubricating agent, a flame-retardant, a fungicide, an acid acceptor, an antistatic agent, a coloring agent, a crosslinking accelerator, cross-linking auxiliaries, a cross-linking retardant, etc. Amounts of these compounding agents are not particularly limited as far as they are in the range not to disturb the purpose and effects of the present invention, and suitable amounts for the purpose of blending can be appropriately selected.

Also, the cross-linkable nitrile rubber composition of the present invention may include rubbers other than the nitrile rubber (a) within the range not to disturb the purpose and effects thereof. A content of the other rubbers is preferably 50 parts by weight or less, more preferably 10 parts by weight or less per 100 parts by weight of the nitrile rubber (a).

Production Methods of Nitrile Rubber Composition and Cross-Linkable Nitrile Rubber Composition The nitrile rubber composition and cross-linkable nitrile rubber composition of the present invention are produced by mixing each of the above components preferably in nonaqueous system. A method for mixing is not limited, but in the case of the cross-linkable nitrile rubber composition, it is preferable that components excluding the crosslinking agent, etc., which are unstable to heat, are primarily kneaded in a mixer such as a Bambury mixer, intermixer and kneader, and then secondarily kneaded after transferring it into a roll, etc., and adding the crosslinking agent, etc.

The nitrile rubber composition of the present invention has Mooney viscosity [$ML_{1+4}$ (100° C.)] (compound Mooney) of preferably 15 to 200, more preferably 20 to 150. Also, the cross-linkable nitrile rubber composition of the present invention has Mooney viscosity [$ML_{1+4}$ (100° C.)] (compound Mooney) of preferably 15 to 150, more preferably 30 to 120. Since the cross-linkable nitrile rubber composition of the present invention has the above compound Mooney, it is excellent in molding processability. Note that the above Mooney viscosity is measured in accordance with JIS K6300.

Cross-Linked Rubber

The cross-linked rubber of the present invention is obtained by crosslinking the above cross-linkable nitrile rubber composition.

To obtain the cross-linked rubber by crosslinking, the cross-linkable nitrile rubber composition is molded by using a molding machine suitable for a desired rubber shape, such as an extruder, an injection molding machine, a compactor, a roll and the like, and fixing the shape as a cross-linked rubber by crosslinking reaction. It may be cross-linked after molding or simultaneously. Molding temperature is preferably 10 to 200° C., more preferably 25 to 120° C. Crosslinking temperature is preferably 100 to 200° C., more preferably 130 to 190° C., and crosslinking time is preferably 1 minute to 24 hours, more preferably 2 minutes to 1 hour.

Also, depending on the shape, size, etc., of the cross-linked rubber, the inside may not be sufficiently cross-linked even if the surface is cross-linked, so that it may be secondarily cross-linked by further heating.

The cross-linked rubber of the present invention is excellent in mechanical properties such as tensile stress and small in compression set. Particularly, it shows low rate of change in elongation in heat aging test, indicating further improvement in heat resistance.

Since it has the above properties, the cross-linked rubber of the present invention can be used in wide range of application subjected to repeated strong shear stress including a variety of belts such as power driving flat belt, conveyer belt, V belt, timing belt and toothed belt; a variety of seal materials such as valve and bubble sheet, BOP (BlowOut Preventer), platter, O-ring, packing, gasket, diaphragm and oil-seal; attenuation rubber components such as cushion material, dynamic damper, rubber coupling, air spring and vibration-proofing materials; a variety of hoses such as fuel hose, oil hose, marine hose, riser and flow line; a variety of rolls such as printing roll, iron-making roll, papermaking roll, industrial roll and roll for business equipment; a variety of boots such as CVJ boots and propeller shaft boots; etc., as well as dust cover, automobile interior member, jacketed cable and shoe sole, and particularly, it is useful for a belt or seal material.

EXAMPLES

Hereinafter, the present invention will be specifically described based on Examples and Comparative Examples, but the present invention is not limited to these examples. Note that "parts" in the following indicates a weight base unless otherwise particularly designated.

Tests and evaluations were performed as below.

(1) Iodine Value

Iodine value was measured in accordance with JIS K6235.

(2) Mooney Viscosity [$ML_{1+4}$ (100° C.)]

Mooney viscosity (polymer Mooney) of the nitrile rubber was measured in accordance with JIS K6300.

(3) Normal Physical Properties (Tensile Strength and Elongation)

The crosslinkable nitrile rubber composition was placed in a mold with a length of 15 cm, a width of 15 cm and a depth of 0.2 cm, and cross-linked at 170° C. for 20 minutes at a pressed pressure of 10 MPa, to prepare a test specimen. Tensile strength and elongation of the cross-linked rubber were measured in accordance with JIS K6251 by using the obtained test specimen.

(4) Heat Aging Test

By using a test specimen produced by crosslink as in the above (3), tensile strength, elongation and rate of change in elongation (%) at 150° C. after 24 hours were obtained in accordance with JIS K6257 (normal oven method).

Example 1

100 parts of nitrile group containing highly-saturated copolymer rubber [product name "Zetpol 2010L" manufactured by Nippon Zeon Co., Ltd., a hydrogenated acrylonitrile-butadiene copolymer rubber having acrylonitrile unit content of 36%, iodine value of 11 and Mooney viscosity ($ML_{1+4}$, 100° C.) of 85], 15 parts of zinc dimethacrylate, 1.5 parts of 4,4'-di-($\alpha,\alpha'$-dimethylbenzil)diphenylamine (product name "Naugard 445", Crompton-Uniroyal Chemical) as an anti-aging agent, 1.5 parts of zinc salt of 2-mercaptobenzimidazole (NoCRAC MBZ manufactured by Ouchi Shinko Chemical Industrial), 40 parts of silica (1) (see the following Note *1), 10 parts of zinc oxide (zinc white No. 1) as a crosslinking accelerator, 8 parts of trimellitic acid ester (product name "ADEKA CIZER C8" manufactured by Asahi Denka Company Limited) as a plasticizer and 8 parts of 40% product of 1,3-bis(t-butyl peroxyisopropyl)benzene (Vulcup 40KE by GEO Specialty Chemicals Inc., an organic peroxide) (3.2 parts of pure organic peroxide) were kneaded at 50° C. in a open roll to prepare a cross-linkable nitrile rubber composition. A cross-linked rubber obtained by this was subject to each test and evaluation of normal physical properties (tensile strength, elongation, 100% tensile stress) and heat aging test (tensile strength, elongation, rate of change in elongation). The results are shown in Table 1.

Note *1: The silica (1) was silane-treated fumed silica (product name "Aerosil R972" manufactured by Nippon Aerosil Co., Ltd., having specific surface area of 110 $m^2/g$ and pH=3.8). This was obtained by treating "Aerosil 130" manufactured by Nippon Aerosil Co., Ltd. with dimethyldichlorosilane.

Example 2

Except for using silica (2) (see the following Note *2) instead of the silica (1), a cross-linkable nitrile rubber composition was produced as in the Example 1. Same tests and evaluations were performed as in the Example 1, and the results are shown in Table 1.

Note *2: The silica (2) is calcinated wet silica (product name "Carplex CS-7", manufactured by Shionogi & Co., Ltd., having specific surface area of 133 $m^2/g$ and pH=6.9).

Comparative Example 1

Except for using silica (3) (see the following Note *3) instead of the silica (1), a cross-linkable nitrile rubber composition was produced as in the Example 1. Same tests and evaluations were performed as in the Example 1, and the results are shown in Table 1.

Note *3: The silica (3) is wet silica obtained by a precipitation method (product name "Nipsil VN-3" manufactured by Tosoh Silica Corporation, having specific surface area of 195 $m^2/g$).

Comparative Example 2

Except for adding 2 parts of vinyl tris($\beta$-methoxyethoxy)silane (product name "A-172" manufactured by Nippon Unicar Company Limited) as a silane coupling agent, a cross-linkable nitrile rubber composition was produced as in the Comparative Example 1. Same tests and evaluation were performed as in the Example 1, and the results are shown in Table 1.

Comparative Example 3

Except for using silica (4) (see the following Note *4) instead of the silica (1), a cross-linkable nitrile rubber composition was produced as in the Example 1. Same tests and evaluations were performed as in the Example 1, and the results are shown in Table 1.

Note *4: The silica (4) is fumed silica (product name "Aerosil 200" manufactured by Nippon Aerosil Co., Ltd., having specific surface area of 200 $m^2/g$).

Comparative Example 4

Except for not adding 15 parts of zinc dimethacrylate, a cross-linkable nitrile rubber composition was produced as in the Example 1. Same tests and evaluations were performed as in the Example 1, and the results are shown in Table 1.

TABLE 1

|  |  | Examples | | Comparative Examples | | | |
|---|---|---|---|---|---|---|---|
|  |  | 1 | 2 | 1 | 2 | 3 | 4 |
| Components (parts) | Zinc dimethacrylate | 15 | 15 | 15 | 15 | 15 | — |
|  | Silica (1) "Aerosil R972" | 40 | — | — | — | — | 40 |
|  | Silica (2) "Carplex CS-7" | — | 40 | — | — | — | — |
|  | Silica (3) "Nipsil VN-3" | — | — | 40 | 40 | — | — |
|  | Silica (4) "Aerosil 200" | — | — | — | — | 40 | — |
|  | Silane Coupling Agent "A-172" | — | — | — | 2 | — | — |
| Normal Physical Properties | Tensile Strength (MPa) | 26.5 | 25.5 | 25.7 | 27.0 | 25.3 | 24.1 |
|  | Elongation (%) | 470 | 430 | 480 | 460 | 460 | 430 |
|  | 100% Tensile Stress (MPa) | 7.3 | 8.5 | 6.8 | 6.8 | 7.3 | 3.2 |
| Heat Aging Test | Tensile Strength (MPa) | 27.6 | 27.6 | 28.0 | 27.2 | 26.6 | 25.0 |
|  | Elongation (%) | 390 | 350 | 270 | 260 | 290 | 360 |
|  | Rate of Change in Elongation (%) | −17 | −19 | −44 | −43 | −37 | −16 |

As shown in Table 1, the cross-linked rubber obtained by crosslinking the nitrile rubber composition satisfying the requirements of the present invention had sufficient normal physical properties (tensile strength, elongation and 100% tensile stress), which were hardly deteriorated even by heating at 150° for 24 hours, indicating good heat resistance (Examples 1 and 2).

On the other hand, when using wet silica or the same added with a silane coupling agent, the resulting cross-linked rubbers were significantly reduced in elongation due to heat, indicating inferior heat resistance (Comparative Examples 1 and 2).

Also similarly, using fumed silica without silane-treatment, the provided cross-linked rubber was low in heat resistance (Comparative Example 3).

Further, the cross-linked rubber obtained by using the nitrile rubber composition not including zinc dimethacrylate was significantly inferior in tensile stress (Comparative Example 4).

The invention claimed is:

1. A nitrile rubber composition comprising a nitrile rubber (a) including an α,β-ethylenically unsaturated nitrile monomer unit and having iodine value of 100 or less, an α,β-ethylenically unsaturated carboxylic acid metallic salt (b), and calcinated wet silica (c).

2. The nitrile rubber composition as set forth in claim 1, wherein a content of said α,β-ethylenically unsaturated carboxylic acid metallic salt (b) is 3 to 120 parts by weight per 100 parts by weight of said nitrile rubber (a).

3. The nitrile rubber composition as set forth in claim 1 or 2, wherein a content of said calcinated wet silica (c) is 5 to 300 parts by weight per 100 parts by weight of said nitrile rubber (a).

4. The nitrile rubber composition as set forth in claim 1, wherein said α,β-ethylenically unsaturated carboxylic acid metallic salt (b) is a zinc salt and/or magnesium salt of unsaturated monocarboxylic acid.

5. The nitrile rubber composition as set forth in claim 4, wherein said α,β-ethylenically unsaturated carboxylic acid metallic salt (b) is a zinc dimethacrylate.

6. The nitrile rubber composition as set forth in claim 1, wherein said calcinated wet silica is adjusted to have a surface silanol group concentration of 3 groups/nm$^2$ or less by calcinating wet silica.

7. A cross-linkable nitrile rubber composition comprising the nitrile rubber composition as set forth in claim 1 and a crosslinking agent (d).

8. The cross-linkable nitrile rubber composition as set forth in claim 7, wherein a content of said crosslinking agent (d) is 0.2 to 20 parts by weight per 100 parts by weight of the nitrile rubber (a).

9. The cross-linkable nitrile rubber composition as set forth in claim 7, wherein said crosslinking agent (d) is an organic peroxide.

10. A cross-linked rubber obtained by crosslinking the cross-linkable nitrile rubber composition as set forth in claim 7.

11. The cross-linked rubber as set forth in claim 10 which is a belt or seal material.

* * * * *